J. LAWRENCE.
ELECTRIC COOKING APPARATUS.
APPLICATION FILED MAR. 6, 1912.
1,090,924.
Patented Mar. 24, 1914.
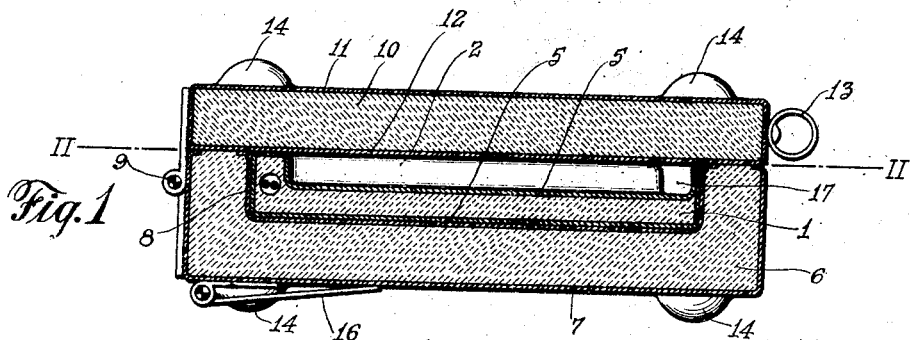
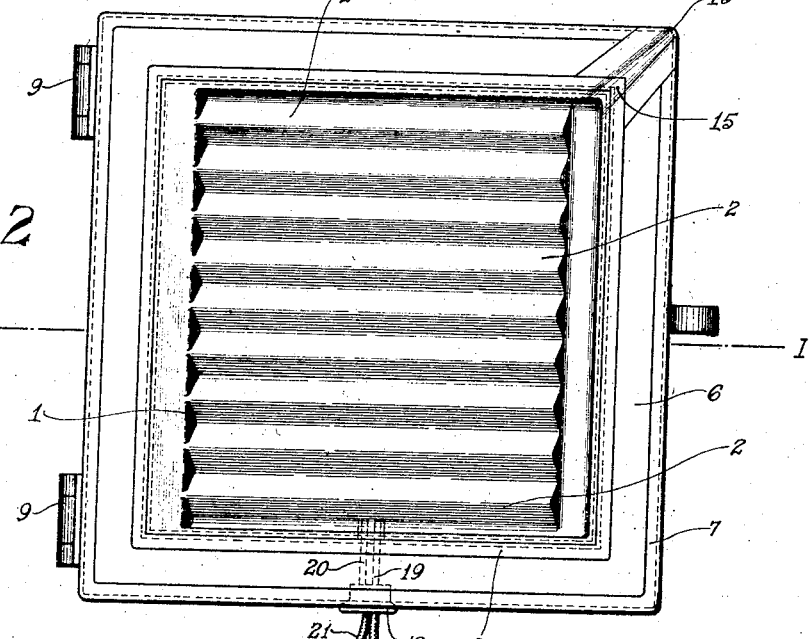
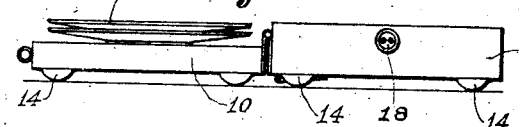
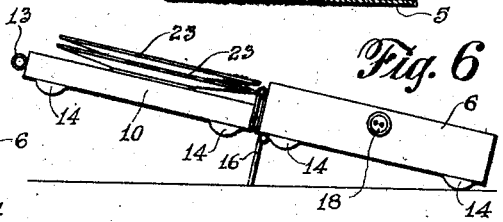
WITNESSES:
T. E. Raftery
J. S. Simpler
INVENTOR.
James Lawrence
BY Kenyon & Kenyon
ATTORNEYS.

UNITED STATES PATENT OFFICE.

JAMES LAWRENCE, OF LONDON, ENGLAND, ASSIGNOR TO ELECTRIC HEAT STORAGE COMPANY, A CORPORATION OF NEW YORK.

ELECTRIC COOKING APPARATUS.

1,090,924.

Specification of Letters Patent. Patented Mar. 24, 1914.

Application filed March 6, 1912. Serial No. 681,899.

*To all whom it may concern:*

Be it known that I, JAMES LAWRENCE, a subject of the King of Great Britain, and a resident of London, England, have invented certain new and useful Improvements in Electric Cooking Apparatus, of which the following is a specification.

My invention relates to improvements in electric heating apparatus for use more particularly for grilling purposes, but which may be employed for frying or heating kettles, &c., or for carrying out other heating operations.

One object of my invention is to provide a grill or cooking device which is of such construction that but a small consumption of power is required, and without any appreciable loss of heat during heating.

A further object of my invention is to provide a device of the class described, which may be readily converted from a grill into a device for heating frying pans, kettles and the like, and which is simple in construction and cheap to manufacture.

Further objects, features and advantages will more clearly appear from the accompanying drawing which forms a part of this specification.

In the drawing, Figure 1 is a vertical section taken on the line I—I of Fig. 2, showing a device embodying my invention in one form. Fig. 2 is a longitudinal section taken on the line II—II of Fig. 1. Fig. 3 is a detail section through the grill, taken at right angles to the section of Fig. 1. Fig. 4 is a similar section but showing a modified arrangement. Fig. 5 is a side view showing the device open. Fig. 6 is a similar side view showing one end of the device raised.

Referring to the drawing, 1 represents a heat storage mass of solid material preferably made of refractory material such as fire clay, or of any suitable alloy such as "calorite." On its top face the heat storage mass 1 is provided with longitudinal grilling ribs 2, the ribs 2 being provided with longitudinal holes 3 therein, for the purpose of receiving the electric resistance wires 4, or other heating elements. The heat storage mass 1 may be surrounded by a casing of sheet iron 5, or the casing may be made of a suitable alloy such as "calorite." Surrounding the heat storage mass 1 on the bottom and sides thereof is a covering of heat insulating material 6. This covering 6 is made of any well known heat insulating material, such as magnesia, and is contained in an iron sheath 7. The inner or top surface of the covering 6 may also be provided with an iron sheath 8 or the sheath 8 may be made of the alloy "calorite," or other suitable material.

Hinged to the covering 6 at 9, is a cover 10 fitting closely over the heat-insulating means and also consisting mainly of heat insulating material such as magnesia. The cover 10 is provided on its top with a sheath-sheath 11 and on its bottom with a sheathing 12 of a suitable heat insulating alloy such as "calorite." The cover 10 is provided with a suitable handle 13, and the sheathings 7 and 11 are stamped out to form knobs 14, acting as legs or feet to support the device away from the table or other support upon which the device rests.

The heat storage mass 1 and covering 6 are grooved at 15 for the purpose of pouring off gravy or the like. Pivotally mounted to the bottom of the covering 6 are legs 16 which may be folded against the bottom of the device, as shown in Fig. 1, in which case the device sets horizontally upon the table or the like, or which legs may be bent out, as shown in Fig. 6, in order to raise one edge of the device, as shown in Fig. 6, and thus allow gravy or the like to run out of the spout 15. The ribs 2 do not extend quite to the lower edge of the heat storage mass but stop a little short thereof in order to form a cross groove 17, as shown in Fig. 1, along which the gravy may run to the groove 15. Electrical connection is made with the heating elements 4 by means of a plug switch 18 inserted in an opening in the side of the covering 6, as shown in Fig. 2, which plug switch is provided with two contacts 19 and 20, which complete electrical connection between the heating elements 4 and the conductors 21 and 22.

In operation, for grilling, the apparatus is placed as shown in Fig. 1, and electrically connected in order that the heating elements 4 may supply heat to the heat storage mass 1. The cover is closed, as shown in Fig. 1, and the heat storage mass thoroughly heated to the desired temperature. Little energy is expended in this operation because the storage mass 1 is thoroughly insulated by being surrounded on all sides by the heat insulating material of the covering 6 and cover 10. The storage mass 1 is therefore economically and quickly brought to the desired temperature. Thereupon the cover is thrown back, as shown in Fig. 5 or Fig. 6, and the material to be grilled is placed upon the grilling ribs 2 and cooked in the usual manner. During the cooking the supply of electric energy may be turned off and the cooking done with the heat which has been already stored in the mass 1, or if desired the current may be left on to continually supply heat to the mass 1. It will therefore appear that due to the preliminary heating the cover 10 becomes more or less heated, and while the cooking operation is proceeding the cover 10 may be used for the purpose of heating plates 23, or the like, as shown in Figs. 5 and 6. If it is desired to fry or heat kettles or the like the plug 18 is removed and the storage mass 1 turned upside down, whereupon a flat surface is presented for heating or cooking. The plug is then inserted again to electrically connect the heating elements, and the storage mass brought to the proper temperature as above described. The cover may be then thrown back and the frying operation performed in the usual manner upon the now top of the mass 1, or kettles or other cooking utensils may be placed upon the storage mass 1, to be heated for cooking purposes. Instead of providing the heating elements 4 in longitudinal holes in the ribs 2, the electric resistance wires may be placed just below the ribs 2 in a relatively thin, flat compartment 24, as illustrated in Fig. 4.

From the above it will be clear that the grill or heat storage mass composed of fire clay or other refractory material, is adapted to be entirely inclosed in a casing of heat insulating material while it is being preliminarily heated in order to raise its temperature sufficiently for grilling or other heating purposes, and to be only exposed by opening the covering or casing in order to allow the grilling or other heating operation to be effective.

When it is desired to grill a steak or other article of food, the supports or legs 16 may be swung downward, and serve to support the grill in an inclined position, whereby any gravy or juice may run down along the V shaped grooves to the channel 17, and thence out by the groove 15, and any smoke or fumes that may arise along the V shaped grooves may escape into the air from the upper end of the grill. When the grill 1 is reversed the same may be used for heating a frying pan or kettle, or other vessel, or for toasting, as will be readily understood.

A device constructed according to this invention consumes only a very small amount of power and may be used in heating systems comprising an electrically heated oven. Such ovens can be sufficiently heated at a consumption of about 400 watts per hour, which power is quite sufficient for efficiently heating the grill made according to this invention.

Although I have described my improvements in great detail and with respect to certain particular forms of my invention, nevertheless I do not desire to be limited to such details except as clearly pointed out in the appended claims, since many changes and modifications may well be made without departing from the spirit and scope of my invention in its broadest aspect.

Having fully and clearly described my improvements, what I claim as new and desire to secure by Letters Patent, is:

1. A cooking grill having a heat storage mass provided with a series of substantially parallel grilling ribs, an electrical heating element extending along and substantially within each rib for heating the mass, and heat insulating means partially surrounding said mass.

2. A cooking grill having a solid unitary heat storage mass provided with grilling ribs on one face thereof, electrical heating elements extending within said mass, heat insulating walls covering the bottom and sides of said mass, and a heat insulating cover fitting closely over the top of the mass.

3. A cooking grill having a solid unitary heat storage mass provided with grilling ribs on its top surface, electrical means for internally heating said mass, means for holding one end of the mass elevated whereby the grill may be inclined, said holding means being hinged whereby the mass may be placed in horizontal position.

4. A cooking device having a relatively flat heat storage mass of solid material with grilling ribs thereon, electrical resistance means for internally heating said mass, heat insulating means surrounding said mass on the bottom and sides thereof, and a heat insulating cover for the top of the mass adapted to fit closely over the same.

5. A cooking grill having a heat storage mass provided with ribs on one side thereof, electrical conductors extending within the mass for heating the mass internally, a heat insulating covering surrounding the bottom and sides of the mass, and a heat insulating cover for the top of the mass, said cover being movable to permit the placing of the material on the grill for cooking, after the mass has been heated.

6. A cooking grill having a heat storage mass of solid material, means for heating the mass electrically, a covering of heat insulating material substantially entirely surrounding the mass, and means whereby a portion of said covering may be removed to permit of the material to be cooked being placed on the grill to be heated by the storage mass, said mass having grilling ribs on one side thereof and a cooking face on the other side thereof whereby the mass may be turned upside down in the covering and different cooking operations performed on both sides thereof.

7. A cooking device having a heat storage mass, means for electrically heating the mass, and a heat insulating casing extending about the sides and bottom of said mass, said mass having a cooking face on both sides thereof and adapted to be turned upside down, whereby cooking operations may be carried out on both sides of the mass.

8. A cooking grill having a heat storage mass, electrical resistance heating elements in said mass, said mass being provided with grilling ribs on one side thereof, and a heat insulating casing extending about the bottom and sides of said mass, said mass having a cooking face on the opposite side thereof from the grilling ribs and being adapted to be turned upside down in the casing whereby other cooking operations may be performed on the opposite side thereof from the grilling ribs.

In testimony whereof, I have signed my name to this specification, in the presence of two subscribing witnesses.

JAMES LAWRENCE.

Witnesses:
GORHAM CROSBY,
EDWIN SEGER.

Copies of this patent may be obtained for five cents each, by addressing the "Commissioner of Patents, Washington, D. C."